(12) United States Patent
Errando Smet et al.

(10) Patent No.: US 7,572,018 B2
(45) Date of Patent: Aug. 11, 2009

(54) FOLDING MECHANISM FOR EXTERIOR REAR-VIEW MIRRORS OF AUTOMOTIVE VEHICLES

(75) Inventors: Jorge Errando Smet, Barcelona (ES); Santiago Miguel Sanz, Barcelona (ES); Angel Perez Trujillo, Barcelona (ES)

(73) Assignee: Fico Mirrors, S.A., Barcelona (ES)

( * ) Notice: Subject to any disclaimer, the term of this patent is extended or adjusted under 35 U.S.C. 154(b) by 0 days.

(21) Appl. No.: 11/587,611

(22) PCT Filed: Apr. 25, 2005

(86) PCT No.: PCT/IB2005/001110
§ 371 (c)(1),
(2), (4) Date: Jul. 7, 2008

(87) PCT Pub. No.: WO2005/101960
PCT Pub. Date: Nov. 3, 2005

(65) Prior Publication Data
US 2008/0266688 A1 Oct. 30, 2008

(30) Foreign Application Priority Data
Apr. 27, 2004 (ES) .................. 200400998

(51) Int. Cl.
*G02B 5/08* (2006.01)
*G02B 7/182* (2006.01)
*B60R 1/06* (2006.01)
(52) U.S. Cl. ...................... 359/841; 359/877
(58) Field of Classification Search ............. 359/841, 359/872, 877
See application file for complete search history.

(56) References Cited

U.S. PATENT DOCUMENTS

| 4,919,526 | A | * | 4/1990 | Umekawa et al. | 359/841 |
|---|---|---|---|---|---|
| 4,981,349 | A | * | 1/1991 | Tamiya et al. | 359/877 |
| 5,384,660 | A | * | 1/1995 | Oishi | 359/841 |
| 5,432,640 | A | * | 7/1995 | Gilbert et al. | 359/841 |
| 5,781,354 | A | * | 7/1998 | Sakata | 359/841 |
| 5,867,328 | A | * | 2/1999 | Stapp et al. | 359/841 |

(Continued)

FOREIGN PATENT DOCUMENTS

EP 0 748 719 A2 12/1996

(Continued)

OTHER PUBLICATIONS

International Search Report for PCT International Application No. PCT/IB2005/001110 mailed Aug. 19, 2005.

*Primary Examiner*—Ricky D Shafer
(74) *Attorney, Agent, or Firm*—RatnerPrestia

(57) ABSTRACT

The present invention relates to a folding mechanism for exterior rear-view mirrors in an automotive vehicle, comprising a housing integral with a mirror-carrying casing, and an actuated ring acting as an axis of rotation of the mentioned casing with respect to a support chassis fixed to the vehicle, the ring being provided with first positional fixing means susceptible to coupling the mentioned ring to the support chassis and with second positional fixing means which, in collaboration with a stop element integral with the housing and loaded by un elastic member, limit the rotation of the mentioned casing around the ring and according to one rotating direction, all this with the stop element and the elastic member being integrated in a single piece with elastic properties.

7 Claims, 5 Drawing Sheets

U.S. PATENT DOCUMENTS

| | | | |
|---|---|---|---|
| 6,022,113 A * | 2/2000 | Stolpe et al. | 359/841 |
| 6,322,221 B1 * | 11/2001 | van de Loo | 359/841 |
| 6,390,630 B1 * | 5/2002 | Ochs | 359/841 |
| 6,871,969 B2 * | 3/2005 | Yamauchi et al. | 359/841 |

FOREIGN PATENT DOCUMENTS

| | | |
|---|---|---|
| ES | 2 158 924 | 9/2001 |
| ES | 2166677 A1 | 4/2002 |
| JP | 2003231442 A | 8/2003 |
| WO | WO 02076790 A1 | 10/2002 |

* cited by examiner

FOLDING MECHANISM FOR EXTERIOR REAR-VIEW MIRRORS OF AUTOMOTIVE VEHICLES

This application is a U.S. National Phase application of PCT International Application No. PCT/IB2005/001110 filed Apr. 25, 2005.

FIELD OF THE INVENTION

The present invention is a folding mechanism for exterior rear-view mirrors in automotive vehicles, particularly applicable to exterior rear-view mirrors comprising a housing integral with a mirror-carrying casing adapted to house a rotating ring which connects, with rotating ability, the housing and a support chassis fixed to the vehicle. For that purpose, the ring is provided with first and second positional fixing means between said ring and a support chassis and between the same ring and the mentioned housing, respectively, therefore it is possible to automatically return the mirror-carrying casing to a driving position from a folded position.

BACKGROUND OF THE INVENTION

Implementations of folding mechanisms for exterior rear-view mirrors in automotive vehicles are known which are provided with movement means for a mirror-carrying casing with respect to a support chassis fixed to the structure of a vehicle. Generally, such movement means are arranged in a detachable housing fixed to the mirror-carrying casing and essentially comprise an electric motor and one or more gears adapted for driving a rotating ring linked to the support chassis.

In Spanish patent ES 2158924, the mirror casing supporting the glass of the mirror can be folded by means of a motor secured in the support chassis by a hinge and which can fold under the effect of an impact from a use position. The hinge has a tubular piece fixed in the support chassis and a sleeve which is coaxially pressed by means of a spring against the tubular piece, as well as a limiting device for the rotating movement of the casing around the tubular piece.

This exterior mirror is extremely complex given that it requires two elements acting together by means of an swinging limiter, one of which is arranged on the casing and the other one is arranged coaxially with respect to the tubular piece in the hinge and where a socket disc is located operatively connected to the motor, provided with a rebated movement limiter with a projection and stop, one of both elements of which is configured at the foot of the mirror and the other one at the head of the mirror or in the socket disc.

Spanish patent ES-A-2166677 for an "Automatic Folding Mechanism for Exterior Rear-View Mirrors in Automotive Vehicles" describes a folding mechanism in which a rotating ring housed in a detachable housing fixed to a mirror-carrying casing is linked through positioning means to the support chassis, while at the same time it is linked to the housing through positional fixing means comprising a fixing rod and a compression spring arranged in a cavity of the detachable housing, the rod being adapted so that its projecting end is housed in grooves made on the rotating ring, all this for the purpose of limiting the rotation of the mentioned ring with respect to the housing in one of the rotating directions.

One of the ends of the grooves of the rotating ring must be configured in inclined planar shape so that when the fixing rod rotates with respect to the housing in the suitable direction, it causes the fixing rod to move due to the pressure of said inclined plane against the fixing rod, which leaves the groove sliding over its inclined plane and rests directly on the rotating ring. When the ring rotates in the reverse direction, the opposite end of the fixing groove, lacking an inclined plane, runs against the projecting end of the rod housed in the groove, therefore the rod is not moved, preventing the rotation of the ring with respect to the housing.

The positional fixing means formed by the fixing rod and the spring, as well as the cavity of the detachable housing intended to house them, increase manufacturing and assembly costs. Likewise, if the fixing rod is to prevent the rotation of the ring with respect to the housing in the opposite rotating direction, it is necessary to use different rotating rings to in turn change the end of the grooves provided with the inclined plane.

SUMMARY OF THE INVENTION

The present invention of a folding mechanism for exterior rear-view mirrors in an automotive vehicle solves the mentioned problems of the state of the art with the use of a single rotating ring. Said mechanism is of the type comprising a housing, integral with a mirror-carrying casing comprising drive means coupled to a ring acting as an axis of rotation of the mentioned casing with respect to a support chassis fixed to the vehicle, said mirror-carrying casing being able to be moved from a driving position to a folded position, said ring being provided with first positional fixing means susceptible to coupling the mentioned ring to the support chassis and second ring-shaped positional fixing means, made up of recesses alternating with projections which, in collaboration with a stop element integral with the housing and loaded by an elastic member, limit the rotation of the mentioned casing around the ring and according to one rotating direction, allowing said first positional fixing means to detach the casing from the support chassis if a predetermined external thrust torque on said casing is exceeded, while both positional fixing means cooperate in one rotating direction in a return of said ring to a coupling position and a return of said casing to a driving position.

Essentially the folding mechanism for exterior rear-view mirrors in vehicles is such that the stop element and the elastic member are integrated in a single piece of synthetic material with elastic properties.

According to another feature of the invention, the piece of synthetic material is made up of a fixing lever comprising a power arm and a resistance spring, therefore by means of the elastic reaction of the resistance spring, the outer end of power arm permanently tends to be located tangentially with respect to the second positional fixing means, between the projections of the ring, such that the mentioned outer end of the power arm is moved by the action of the stops when the ring rotates with respect to the housing in one direction, while the outer end rests against the closest projection in the rotating direction when the housing rotates in the direction of the recovery of the driving position, preventing the rotation between the housing and the ring.

According to another feature of the invention, the piece of synthetic material is provided with two fixing points for the fixing it loosely to the housing in which it can be fixed in two inverted and opposing positions.

In a preferred embodiment, the fixing points of the piece of synthetic material are made up of through holes adapted to be traversed by respective fixing rods that the housing is provided with, each fixing rod being provided at its outer end with retention means, such that the lever can be rotated around each fixing rod while at the same time being coupled to the housing.

According to another feature of the invention, arranged on both sides of the housing there are respective support ribs for supporting the piece of synthetic material, each of said ribs comprising a circumferential arch portion, the center of which considerably coincides with the axis of a corresponding fixing rod opposite to the rib, said portion being adapted to receive the support of the outer edge of the piece having the hole in which the corresponding fixing rod is inserted when the power arm is pressed against by one of the projections of the ring.

According to a preferred embodiment, the synthetic material of the single piece is a plastic material, and said plastic material is preferably from the polyamide group.

BRIEF DESCRIPTION OF THE DRAWINGS

By way of a non-limiting example, the attached drawings show an embodiment of the folding mechanism for exterior rear-view mirrors of the invention. In said drawings.

DETAILED DESCRIPTION OF THE INVENTION

Figure 1:
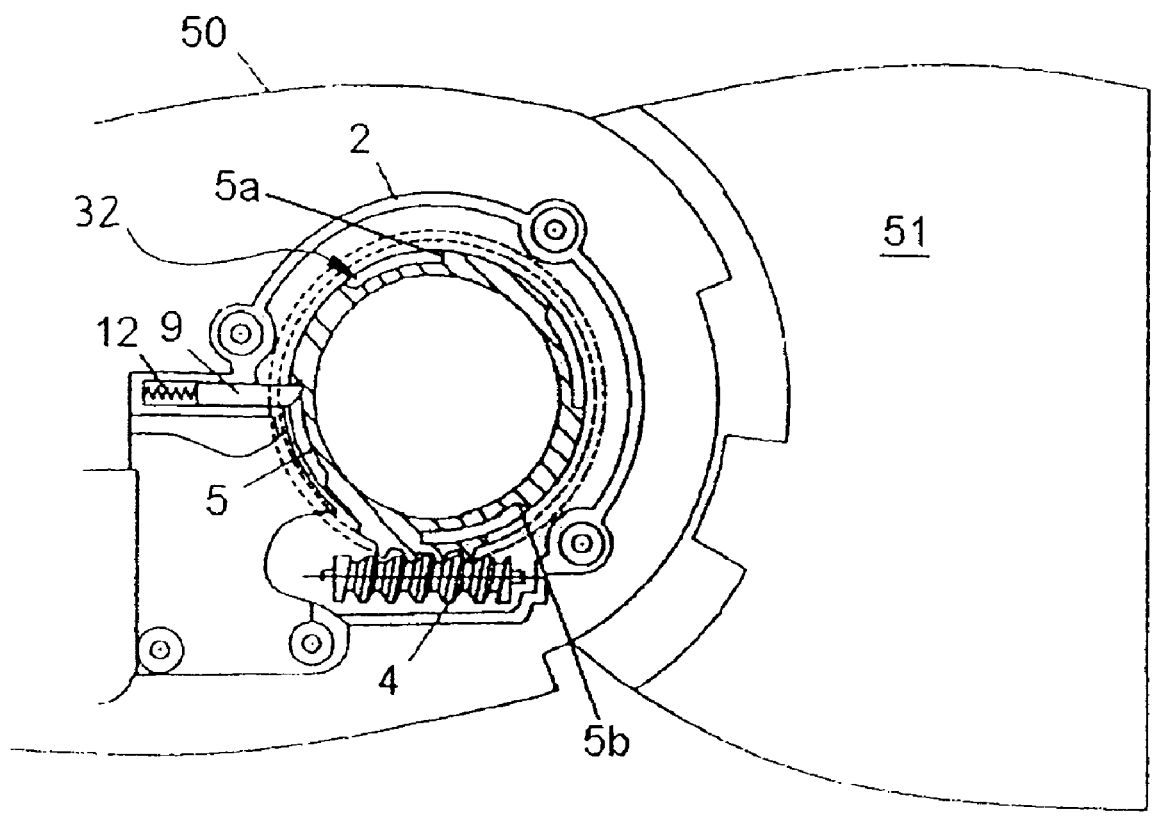
FIG. 1 shows the state of the art described in the previously mentioned patent ES-A-2166677.

The folding mechanism shown in the drawings comprises a housing 2 integral with a mirror-carrying casing 50, said housing 2 comprising drive means 4 coupled to a ring 3 acting as an axis of rotation of the mentioned casing 50 with respect to a support chassis 51 fixed to the vehicle, such that said mirror-carrying casing 50 can move from a driving position (with the mirror operative and extended so as to be used by a driver) to a folded or collapsed position towards the side of the vehicle.

In the example of the figures, the drive means 4 are made up of a worm screw meshed with the rotating ring 3, generally through a corresponding threading 33 arranged on part of the outer surface of the ring 3. The worm screw 4 is actuated by an electric motor 30 fed by the electric supply 29 of the vehicle by means of respective contact elements 31 (see FIG. 2).

The state of the art described in the mentioned patent ES-A-2166677 and shown in FIG. 1 describes, like the present invention, how the rotating ring 3 comprises first positional fixing means 27 (see FIG. 2) susceptible of coupling the mentioned ring 3 to the support chassis 51 and second ring-shaped positional fixing means 32, made up of recesses 5 alternating with projections 5a, 5b which, in collaboration with a stop element 9 integral with the housing 2 and loaded by an elastic member 12, limit the rotation of the mentioned casing 50 around the ring 3 and according to one rotating direction, allowing said first positional fixing means 27 to detach the casing 50 from the support chassis 51 if a predetermined external thrust torque on said casing 50 is exceeded, while both positional fixing means cooperate, in one rotating direction, in facilitating a return of said ring 3 to a coupling position and a return of said casing 50 to a driving position. Said state of the art is reflected in FIG. 1, in which all the mentioned elements are shown with the exception of the first positional fixing means 27, which can be seen (as they are common to the state of the art and to the present invention) in FIG. 2.

Figure 2:
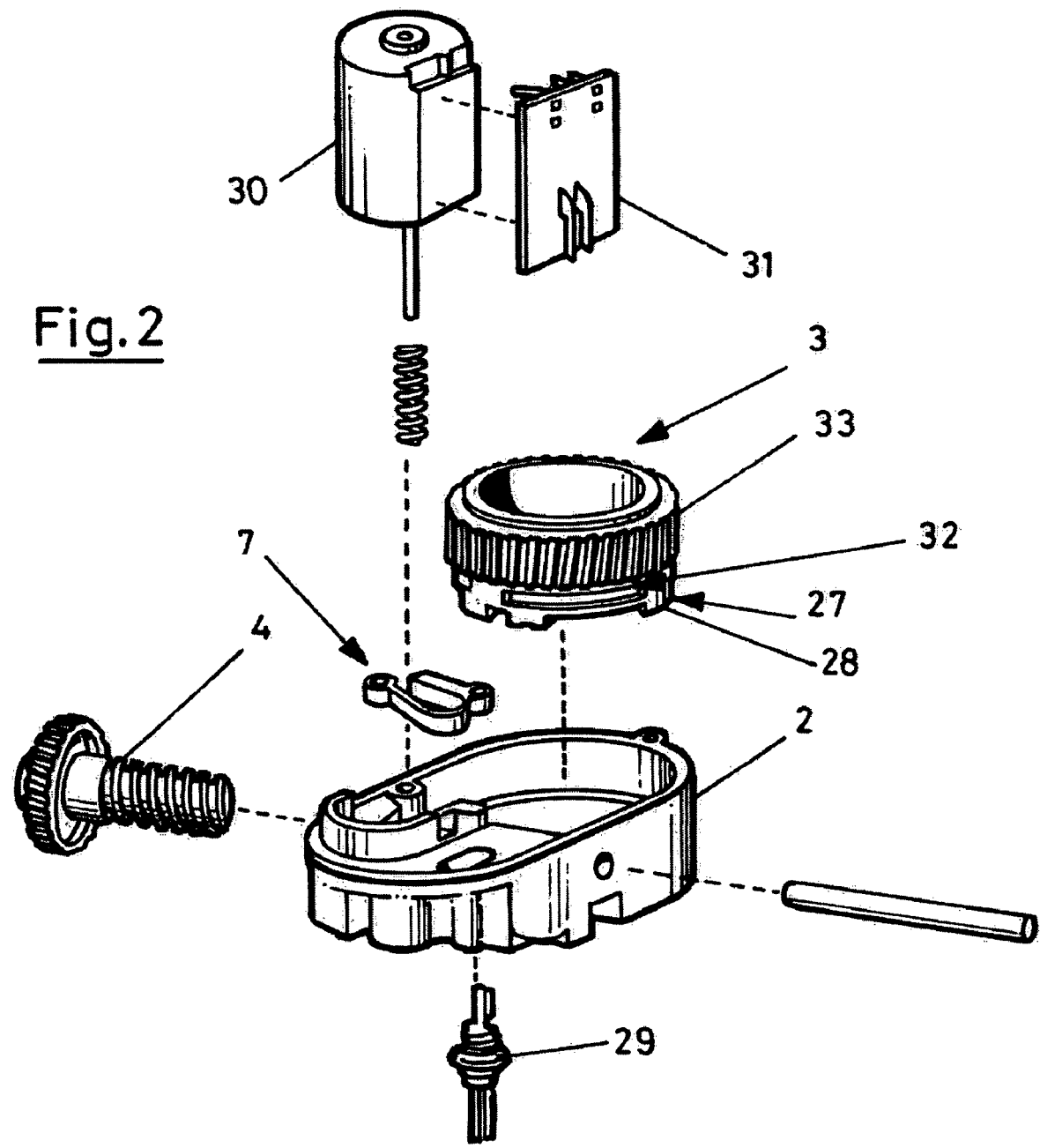
FIG. 2 shows an exploded perspective view of a folding mechanism according to the invention.

The ring 3 generally comprises first 27 and second positional fixing means 32 and the mentioned threading 33 arranged in three levels, as can be seen in FIG. 2.

This structure already known in the state of the art (FIG. 1) is reproduced by the folding mechanism according to the invention, which however has, as will be seen, significant improvements which are essentially based on the materials used in its manufacture, and more specifically on the structure and/or constitution of the stop element 9 integral with the housing 2 and loaded by an elastic member 12 which, in the invention, are formed in a single piece 7 of synthetic material, generally plastic and preferably from the polyamide group, with elastic properties.

In the driving position, the projections 28 of the first positional fixing means 27 are meshed with the recesses of the support chassis 51, and by means of the actuation of the electric motor 30, the driver can move the mirror-carrying casing 50 from said driving position to a parking position.

Figure 3:
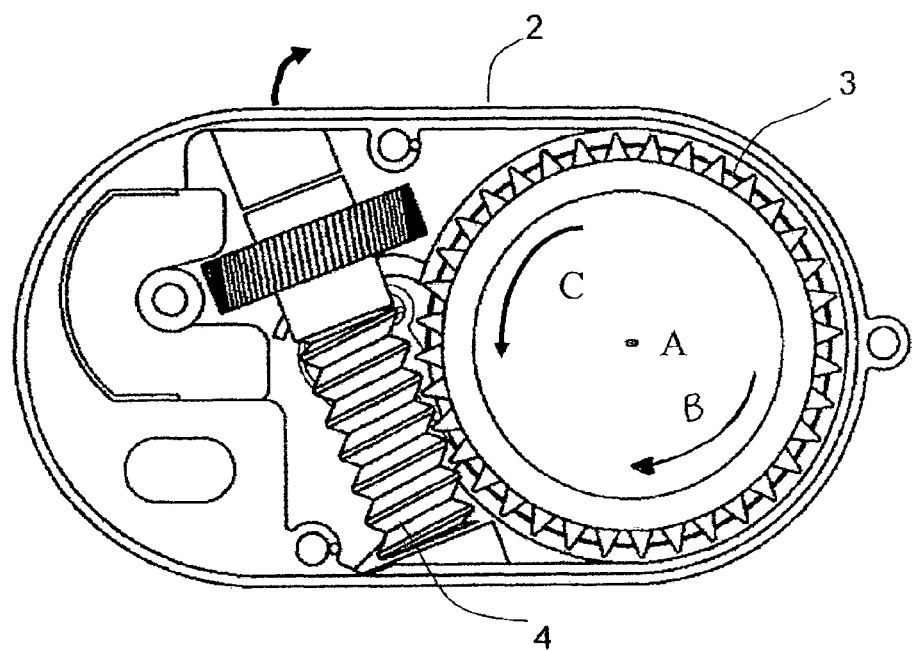
FIG. 3 shows a plan view of the housing of the folding mechanism.

In fact, if the ring 3 is prevented from moving, when the worm screw is actuated a double rotation thereof is caused: a first rotation around its own axis a second rotation simultaneous with the previous one around the ring 3 and the imaginary axis A in the direction indicated by arrow B of FIG. 3. The mirror-carrying casing 50 integral with the housing 2 therefore rotates.

Outer stop means, not shown, stop the rotation of the mirror-carrying casing 50 in the parking position and cause the motor 30 to stop due to the action of an overload detecting device 31 (See FIG. 2).

Figure 4:
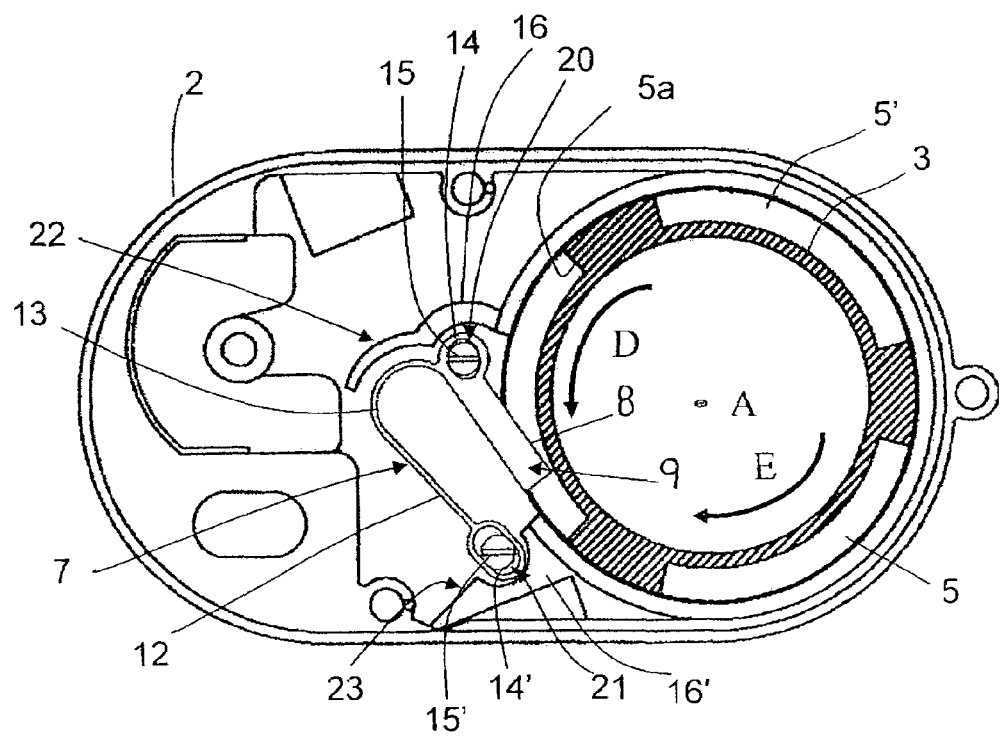
FIGS. 4, 5 and 6 show respective plan views of the housing of FIG. 3, lacking the drive means and with the rotating ring sectioned, in which the ring and housing occupy different relative positions.

If the motor is actuated in the opposite direction, the housing 2 and the mirror-carrying casing 50 move from the parking position to the driving position, as indicated by arrow D of FIG. 4, determined by a stop element 9 integral with the housing 2.

However, when the mirror-carrying casing 50 is moved from its driving position due to manual action or mechanical impact, such that the housing 2 is prevented from moving either due to the action of the outer stop or the stop element 9 of the second positional fixing means 32, the projections 28 further being disengaged from the recesses arranged in the support chassis 51, when the worm screw 4 is actuated the rotation of the screw around its own axis causes the rotation of the ring 3 in the direction indicated by arrow C of FIG. 3 until the projections 28 mesh again with the corresponding recesses of the support chassis 51.

As indicated and according to the invention, in the example of the drawings, the stop element 9 and elastic member 12 are made up of a single piece of synthetic material 7 with elastic properties, configured by way of a fixing lever, comprising (see FIGS. 4, 5, 6 and 7) a power arm 9 and a resistance spring 12 acting under compression.

The piece of synthetic material, fixing lever 7 hereinafter, is provided with two fixing points 20 and 21 for fixing it to the housing 2, made up of respective through holes 14 and 14' adapted to be traversed by respective fixing rods 15 and 15' that the housing 2 is provided with. The through holes 14 and 14' are slightly greater than the body of the fixing rods 15 and 15' therefore the lever 7 can be moved and rotated around each rod 2. Likewise, the fixing rods 15 and 15' are provided with a wide head for retaining the lever, such that the latter can be rotated around each rod 15, 15' while at the same time being coupled loosely to the housing 2.

As can be seen in FIGS. 4 to 7, the lever or stop element 7 comprises a curved portion 13 which, while at the same time linking the power arm 9 to a straight section opposite to the power arm 9, acts as a resistance spring 12. The through hole 14 is arranged in the fulcrum of the lever 7, around which the power arm 9 can rotate, and through hole 14' is arranged at the end of the straight section opposite to the power arm 9.

At the same time, the ring 3 is provided with peripheral positional fixing grooves 5 regularly distributed on its outer face, inside of which the outer end 8 of the power arm 9 permanently tends to be introduced due to the action of the resistance spring 12. The lever 7 is fixed to the housing 2 such that the outer end 8 of the power arm 9 is arranged tangentially to the outer surface of the ring 3, therefore the lever 7 is susceptible to being coupled and detached from the grooves 5 according to the rotating direction of the ring 3 with respect to the housing 2.

Figure 6:
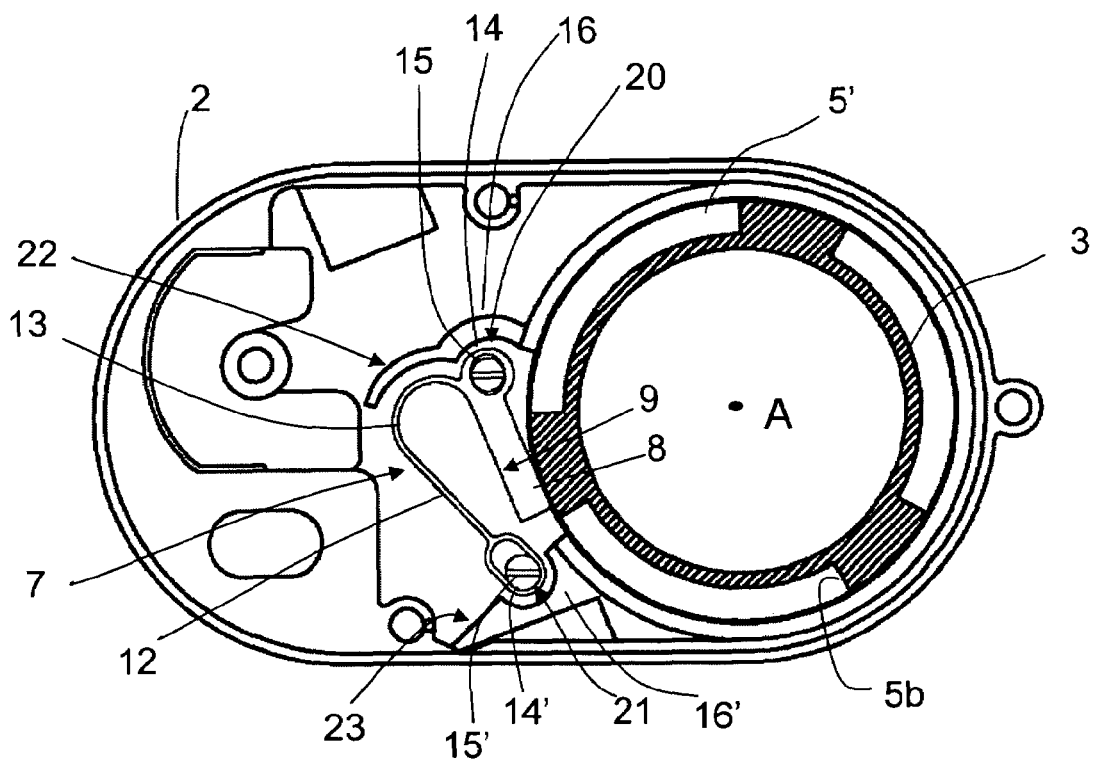

In fact, with the lever 7 being fixed to the housing 2 as indicated in FIG. 4, if a relative rotation of the ring 3 with respect to the housing occurs as indicated by arrow D of FIG. 4, the end 5a of the groove 5 will move, due to pressure against the outer end 8, the power arm 9 of the lever 7, such that said outer end will leave the fixing groove 5, detaching from the ring 3, allowing the rotation thereof with respect to the housing 2 (see FIG. 6). When this occurs, the resistance spring 12 is further compressed and the lever 7 slightly moves.

If the rotating movement of the ring 3 continues, the outer end 8 of the lever 7 will again be introduced in the groove 5' arranged after the previous groove, because due to the elastic action of the resistance spring 12, the power arm 9 always tends to be located as is shown in FIG. 4.

In this manner, as previously explained, with the mirror-carrying casing 50 being prevented from moving due to the action of the outer stop, the lever 7 does not prevent the rotating ring 3 from being actuated by the drive means 4 until the meshing of the projections 28 (shown in FIG. 2) occurs, the ring 3 and the support chassis 51 being coupled. This situation is shown in FIG. 6.

However, if relative rotation of the ring 3 occurs with respect to the housing 2 as indicated by arrow E of FIG. 4, the end 5b of the groove 5 will receive the support of the end 8 of the power arm 9 of the lever 7, which will act as a stop and prevent the rotating movement between the housing 2 and the ring 3 from continuing, stopping the electric motor.

To prevent a large part of the force transmitted by the ring 3 to the power arm 9 from being absorbed by the fixing rod 15, the housing 2 is provided with support ribs 22, 23 for the fixing lever 7. In the example of the figures, the ribs 22, 23 comprise a circumferential arch portion 16, 16'. In the situation shown in FIG. 5, the circumferential arch portion 16 of the rib 22, the center of which considerably coincides with the opposing fixing rod 15, receives the support of the end edge of the lever 7 having the through hole 14, as shown in FIG. 5.

Figure 5:
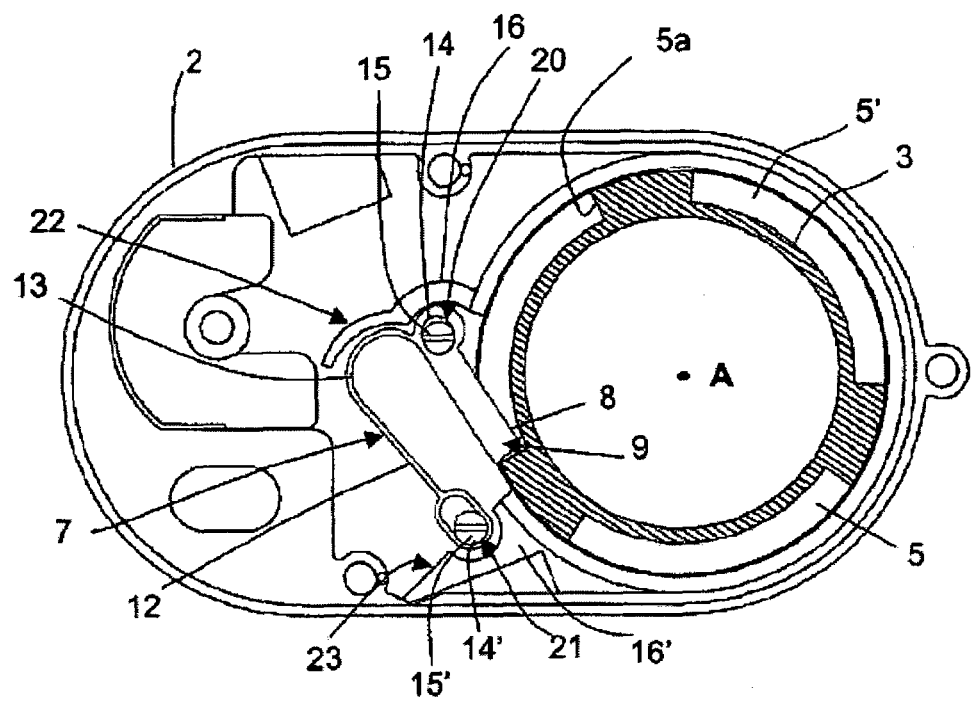
Figure 7:
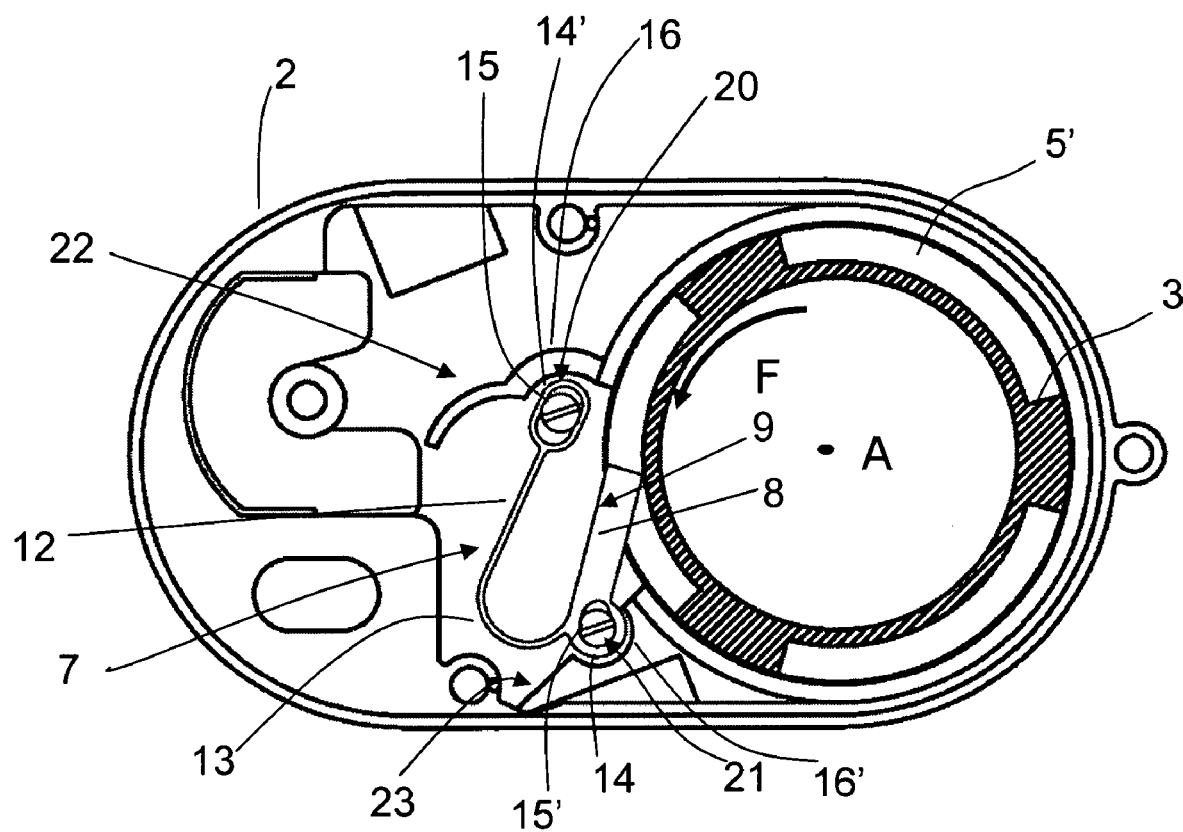
FIG. 7 shows a plan view of the housing of FIG. 4, in which the fixing means are fixed in an inverted and opposing position with respect to the position shown in said FIG. 4.

It must be observed that the fixing rods 15 and 15' are arranged in the housing 2 such that the lever 7 can be fixed in an inverted and opposite position compared to the one shown in the FIGS. 4, 5 and 6, as shown in FIG. 7.

When the lever is fixed according to FIG. 7, the curved portion 16' of the rib 23 receives the support of the end of the lever 7 having the through hole 14.

According to this arrangement, the mechanism functions in the same manner although the relative rotating movement between the ring 3 and the housing 2, and hence the casing 50, is prevented in the opposite rotating direction, i.e. when the ring 3 rotates with respect to the housing 2 according to arrow F of FIG. 7. This feature allows, without having to replace the ring 3, choosing the rotating direction in which the mirror-carrying casing 50 is stopped by the stop element 9, the rotation thereof being stopped when it reaches the driving position. The device can thus be used invariably in rear-view mirrors intended on being arranged on the driver's side in a vehicle or on the opposite side according to how the lever 7 is fixed to the housing 2.

A person skilled in the art may introduce changes and modifications in the described embodiment without departing from the scope of the invention as it is defined in the attached claims.

The invention claimed is:

1. A folding mechanism for exterior rear-view mirrors in an automotive vehicle comprising a housing integral with a mirror-carrying casing comprising said housing drive means coupled to a ring acting as an axis of rotation of the mentioned casing with respect to a support chassis fixed to the vehicle, said mirror-carrying casing being able to be moved from a driving position to a folded position, said ring being provided with first positional fixing means susceptible to coupling the mentioned ring to the support chassis and with second ring-shaped positional fixing means made up of recesses alternated with projections which, in collaboration with a stop element, integral with the housing and loaded by an elastic member, limit the rotation of the mentioned casing around ring and according to one rotating direction, allowing said first positional fixing means to decouple the casing from the support chassis if a predetermined external thrust torque is exceeded by said casing, while both positional fixing means cooperate, in one rotating direction, in a return of said ring to a coupling position and a return of said casing to a driving position, wherein the stop element and the elastic member are integrated in a single piece of synthetic material with elastic properties.

2. A folding mechanism according to claim 1, wherein the piece of synthetic material is made up of a fixing lever comprising a power arm and a resistance spring, therefore by elastic reaction of the resistance spring the outer end of the power arm permanently tends to be located tangentially with respect to the second positional fixing means, between the projections of the ring, such that the mentioned outer end of the power arm is moved by the action of the projections when the ring rotates with respect to the casing in one direction, while the outer end rests against a closest projection in the rotating direction when the casing rotates in the direction of a recovery of the driving position, preventing the rotation between the casing and the ring.

3. A folding mechanism according to claim 2, wherein the piece of synthetic material is provided with two fixing points for fixing it loosely to the housing in which it can be fixed in two inverted and opposite positions.

4. A folding mechanism according to claim 3, wherein the fixing points of the piece of synthetic material are made up of through holes adapted to be traversed by respective fixing rods that the housing is provided with, each fixing rod being provided at its outer end with retention means, such that the lever can be rotated around each fixing rod while at the same time being coupled to the housing.

5. A folding mechanism according to claim 4, wherein arranged at both sides of the housing there are respective support ribs for supporting the piece of synthetic material, each of said ribs comprising a circumferential arch portion the center of which considerably coincides with the axis of a corresponding fixing rod opposite to the rib, said portion being adapted to receive the support of the outer edge of the piece having the hole in which the corresponding fixing rod is inserted when the power arm is pressed against by one of the projections of the ring.

6. A folding mechanism according to claim 1, wherein said synthetic material is a plastic material.

7. A folding mechanism according to claim 6, wherein said plastic material is from a polyamide group.

* * * * *